(12) United States Patent
Gajiwala et al.

(10) Patent No.: US 11,306,683 B2
(45) Date of Patent: Apr. 19, 2022

(54) PRECURSOR COMPOSITIONS FOR AN INSULATION AND INSULATED ROCKET MOTORS

(71) Applicant: Northrop Grumman Systems Corporation, Falls Church, VA (US)

(72) Inventors: Himansu M. Gajiwala, Layton, UT (US); Steven B. Hall, Perry, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 65 days.

(21) Appl. No.: 16/809,396

(22) Filed: Mar. 4, 2020

(65) Prior Publication Data

US 2021/0079873 A1 Mar. 18, 2021

Related U.S. Application Data

(63) Continuation of application No. 15/461,339, filed on Mar. 16, 2017, now Pat. No. 10,612,492.

(51) Int. Cl.
| | |
|---|---|
| *F02K 9/34* | (2006.01) |
| *B64G 1/40* | (2006.01) |
| *C08L 23/16* | (2006.01) |
| *C08F 255/06* | (2006.01) |
| *C08K 3/36* | (2006.01) |
| *C08K 9/04* | (2006.01) |
| *C08K 3/22* | (2006.01) |

(52) U.S. Cl.
CPC .............. *F02K 9/346* (2013.01); *B64G 1/40* (2013.01); *C08F 255/06* (2013.01); *C08K 3/22* (2013.01); *C08K 3/36* (2013.01); *C08K 9/04* (2013.01); *C08K 2003/2296* (2013.01); *C08L 2201/08* (2013.01); *C08L 2205/06* (2013.01); *F05D 2220/80* (2013.01); *F05D 2230/90* (2013.01)

(58) Field of Classification Search
None
See application file for complete search history.

(56) References Cited

U.S. PATENT DOCUMENTS

| | | |
|---|---|---|
| 2,303,329 A | 12/1942 | Cyr |
| 4,878,431 A | 11/1989 | Herring |
| (Continued) | | |

FOREIGN PATENT DOCUMENTS

| | | |
|---|---|---|
| CN | 105754273 A | 7/2016 |
| CN | 107057196 A | 8/2017 |
| (Continued) | | |

OTHER PUBLICATIONS

Asbury Carbons "Expandable Graphite"; Accessed Oct. 17, 2017 at https://asbury.com/brochures-literature/brochures-2/; (2 pages); Asbury Carbon Anthracite Industries Division.

(Continued)

*Primary Examiner* — Vu A Nguyen
(74) *Attorney, Agent, or Firm* — TraskBritt

(57) ABSTRACT

A precursor composition comprising, before curing, ethylene propylene diene monomer (EPDM), zinc oxide, silica, polymerized 1,2-dihydro-2,2,4-trimethylquinoline, a solid chlorinated paraffin, stearic acid, a five carbon petroleum hydrocarbon, trimethylolpropane trimethacrylate, and a peroxide. A rocket motor including a reaction product of the precursor composition and a method of insulating a rocket motor.

23 Claims, 5 Drawing Sheets

(56) References Cited

U.S. PATENT DOCUMENTS

| | | | |
|---|---|---|---|
| 5,352,312 | A | 10/1994 | Guillot |
| 5,821,284 | A | 10/1998 | Graham et al. |
| 6,566,420 | B1 | 5/2003 | Guillot et al. |
| 6,606,852 | B1 * | 8/2003 | Harvey ............... C08K 9/06 |
| | | | 523/138 |
| 6,691,505 | B2 | 2/2004 | Harvey et al. |
| 6,953,823 | B2 | 10/2005 | Fan |
| 7,012,107 | B2 | 3/2006 | Harvey et al. |
| 7,070,705 | B2 | 7/2006 | Harvey et al. |
| 7,410,607 | B2 | 8/2008 | Guillot |
| 7,461,503 | B2 | 12/2008 | Gajiwala |
| 7,485,060 | B2 | 2/2009 | Hineno et al. |
| 7,767,746 | B2 | 8/2010 | Gajiwala |
| 2002/0018847 | A1 | 2/2002 | Guillot |
| 2002/0189233 | A1 | 12/2002 | Harvey et al. |
| 2003/0181545 | A1 | 9/2003 | Barboric et al. |
| 2004/0106732 | A1 | 6/2004 | Tsuji et al. |
| 2004/0229989 | A1 | 11/2004 | Fan |
| 2007/0112091 | A1 | 5/2007 | Fan et al. |
| 2007/0112136 | A1 | 5/2007 | Nakano et al. |
| 2007/0261385 | A1 | 11/2007 | Gajiwala |
| 2007/0270540 | A1 | 11/2007 | Kanae et al. |
| 2009/0137700 | A1 | 5/2009 | Gajiwala |
| 2010/0210770 | A1 * | 8/2010 | Nadeau ............... C08L 21/00 |
| | | | 524/300 |
| 2011/0086735 | A1 | 4/2011 | Takahashi et al. |
| 2011/0186775 | A1 | 8/2011 | Shah et al. |
| 2012/0021860 | A1 | 1/2012 | Matsuda |
| 2012/0153242 | A1 | 6/2012 | Le Bonte et al. |
| 2014/0011963 | A1 | 1/2014 | Mccauley et al. |
| 2014/0255635 | A1 | 9/2014 | Morgan et al. |
| 2015/0203668 | A1 | 7/2015 | Bedard et al. |
| 2018/0265692 | A1 | 9/2018 | Gajiwala et al. |

FOREIGN PATENT DOCUMENTS

| | | |
|---|---|---|
| CN | 104875467 B | 9/2017 |
| EP | 0116453 A2 | 8/1984 |
| EP | 0569995 A1 | 12/1998 |
| EP | 3045770 A1 | 7/2016 |
| EP | 3184585 A1 | 6/2017 |
| JP | 59-174340 A | 10/1984 |
| JP | 2002-535812 A | 10/2002 |
| JP | 2003-504474 A | 2/2003 |
| JP | 2011-174004 A | 9/2011 |
| WO | 01/04198 A1 | 1/2001 |
| WO | 2014/168979 A1 | 10/2014 |

OTHER PUBLICATIONS

Dow Technical Information, NORDEL IP 4520 Hydrocarbon Rubber, 2 pages; Form No. 400-00084029en, Rev: Jan. 11, 2012.
Encyclopaedia Britannica "Paraffin hydrocarbon Chemical Compound" Article, 1 page; https://www.britannica.com/science/paraffin-hydrocarbon; accessed Nov. 14, 2019.
European Extended Search Report and Opinion for European Application No. 18200704.7, dated Mar. 19, 2019, 6 pages.
European Search Report and Search Opinion Received for EP Application No. 18160620.3, dated May 25, 2018, 6 pages.
Gajiwala et al., U.S. Patent Application entitled, "Precursor Compositions for an Insulation, Insulated Rocket Motors, and Related Methods," U.S. Appl. No. 15/793,862, filed Oct. 25, 2017.
Graphistrength Advanced Materials, Graphistrength EPDM; CNT Masterbatch Technical Data Sheet (2 pages).
Japanese Notice of Reasons for Refusal for Japanese Application No. 2018-045014, dated Feb. 28, 2019, 11 pages with English Translation.
LANXESS Deutschland GmbH, "KELTAN 2650 Product Data Sheet" Issue No. LX10/Publication issued Sep. 24, 2013, 2 pages.
LANXESS Energizing Chemistry, Buna (Registered) EP, Ethylene Propylene Rubber, The Versatile Elastomer, Edition May 2007, Publication, May 2007, 24 pages.
Martin Marietta Magnesia Specialties, LLC "MagShield (Registered) S Standard Grade Magnesium Hydroxide for Flame Retardant Applications" Copyright (Copyright) 2015 by Martin Marietta Magnesia Specialties, LLC Version Jan. 28, 2015, 1 page.
Moore et al., "Reusable Solid Rocket Motor—Accomplishments, Lessons, and a Culture of Success" Article, NASA Marshall Space Flight Center Huntsville, Alabama, (2011), 28 pages.
Nordel EPDM Product Selection Guide, Published Apr. 2014, (Copyright) 2014 The Dow Chemical Company, 8 pages.
OxyChem Dechlorane Plus Manual, CAS Registry No. 13560-89-9, 51 Pages; https://www.oxy.com/OurBusinesses/Chemicals/Products/Documents/dechloraneplus/dechlorane_plus.pdf; accessed Nov. 14, 2019.
Prasher et al. "Turning Carbon Nanotubes from Exceptional Heat Conductors into Insulators" Physical Review Letters 102, 105901 (2009) 4 pages.
Search Report in European Application No. 18160620.3 dated May 25, 2018, 6 pages.
Teijin "Twaron—a versatile high-performance fiber", brochure (7 pages) accessed Oct. 17, 2017 at: http://www.teijinaramid.com/wp-content/uploads/2017/07/Twaron-product-brochure-English.pdf.
U.S. Patent Application filed Mar. 16, 2017 Entitled "Precursor Compositions for an Insulation, Insulated Rocket Motors, and Related Methods", U.S. Appl. No. 15/461,339.
U.S. Patent Application filed Oct. 6, 2017 Entitled "Precursor Compositions for an Insulation, Insulated Rocket Motors, and Related Methods", U.S. Appl. No. 15/726,731.
Corrosionpedia, "Hydrocarbon Solvent", https://www.corrosionpedia.com/definition/2182/hydrocarbon-solvent#:~:text=Corrosionpedia%20explains%20Hydrocarbon%20Solvent&text=Frequently%20used%20aliphatic%20hydrocarbon%20solvents,heptanes%2C%20hexanes%20and%20mineral%20spirits.&text=The%20primary%20use%20for%20these,as%20grease%20and%20oil%20spills, Last Accessed Jan. 20, 2021, Last Updated Feb. 27, 2018, 2 pages.
European Communication pursuant to Article 94(3) EPC for European Application No. 18160620.3, dated May 6, 2020, 3 pages.
Polymer Properties Database, Hydrocarbon Resins (C5 and C9 Resins), https://polymerdatabase.com/polymer%20classes/Hydrocarbon%20resins.html#:~:text=These%20resins%20are%20available%20in,100%20to%20150%C2%B0C.&text=C9%20resins%20are%20very%20versatile%20resins%20that%20are%20compatible%20with%20many%20polymers. Last Accessed Jan. 20, 2021, 2 pages.
Puyang Ruicheng Checmical Co., Ltd, "Petroleum Resin", http://pyrchg.com/petroleum-resin/, Last Accessed Jan. 20, 2021, 8 pages.
Shell Chemicals, "n-Pentane Data Sheet", Nov. 21, 2007, https://www.shell.com/business-customers/chemicals/our-products/solvents-hydrocarbon/pentanes/n-pentane/_jcr_content/par/tabbedcontent/tab/textimage.stream/1519786062416/b21d8f28fc2a3b338bff2244fae7300fdbf82653/datasheet-paraffinsnpentaneeurope.pdf., Last Accessed Jan. 20, 2021, 3 pages.
Cray Valley USA, LLC, "Use of Polybutadiene Coagents in Peroxide Cured Elastomers for Wire and Cable Compounds", Jan. 2010, 19 pages.
European Communication pursuant to Article 94(3) EPC for European Application No. 18200704.7, dated Jan. 12, 2022, 4 pages.

* cited by examiner

US 11,306,683 B2

PRECURSOR COMPOSITIONS FOR AN INSULATION AND INSULATED ROCKET MOTORS

CROSS-REFERENCE TO RELATED APPLICATION

This application is a continuation of U.S. patent application Ser. No. 15/461,339, filed Mar. 16, 2017, now U.S. Pat. No. 10,612,492, issued Apr. 7, 2020, the disclosure of which is hereby incorporated herein in its entirety by this reference.

TECHNICAL FIELD

Embodiments of the disclosure relate to a precursor composition of an insulation for use in an article and to methods of insulating the article. More particularly, embodiments of the disclosure relate to a precursor composition for an insulation for use in various locations on rocket motors or other articles and methods of insulating a rocket motor or other article.

BACKGROUND

Rocket motors include a case that houses an energetic fuel, which may also be characterized as a propellant. An insulation and an optional liner protect the case interior from thermal and erosive effects of particle streams generated by combustion of the energetic fuel or propellant. The rocket motor includes a nozzle operatively associated with the case to receive combustion products generated by combustion of the propellant and to expel the combustion products, generating thrust to propel the rocket motor and associated aerospace vehicle. The insulation is bonded to an interior surface of the case and is fabricated from a composition that, upon curing, is capable of enduring the extreme temperature, pressure, and turbulence conditions produced within the case. High temperature gases and erosive particles are produced with the case during combustion of the energetic fuel or propellant. During use and operation, the temperatures inside the case may reach about 2760° C. (about 5000° F.), pressures exceed about 1500 pounds per square inch ("psi") (about 10.3 MPascal), and velocities of gases reach or exceed Mach 0.2. These conditions, along with a restrictive throat region provided along a passageway between the case and the nozzle, combine to create a high degree of turbulence within the case. In addition, the gases produced during combustion of the fuel or propellant contain high-energy particles that, under a turbulent environment, erode the insulation. Additionally, if the fuel or propellant penetrates through the insulation, the case may melt, be eroded, or otherwise be compromised, causing the rocket motor to fail.

Depending on the configuration of the rocket motor, various combinations of mechanical, thermal, and ablative properties are desired in different sections of the rocket motor. For some sections, high elongation properties are desirable while for other sections, good ablation and/or good mechanical properties are desirable. Some sections need good electrostatic discharge (ESD) properties, while other sections need good insulative properties. To provide the desired properties, conventional rocket motors employ different insulations on different sections of the case. However, the use of the different insulations adds to the cost and complexity of manufacturing the rocket motor.

BRIEF SUMMARY

Disclosed is an embodiment of a precursor composition comprising, before cure, ethylene propylene diene monomer (EPDM), zinc oxide, silica, polymerized 1,2-dihydro-2,2,4-trimethylquinoline, a solid chlorinated paraffin, stearic acid, a five carbon petroleum hydrocarbon, trimethylolpropane trimethacrylate, and a peroxide.

A rocket motor is also disclosed and comprises a case, an insulation on at least a portion of the case, and a propellant in the case. The insulation comprises a reaction product of ethylene propylene diene monomer (EPDM), zinc oxide, silica, polymerized 1,2-dihydro-2,2,4-trimethylquinoline, a solid chlorinated paraffin, stearic acid, a five carbon petroleum hydrocarbon, trimethylolpropane trimethacrylate, and a peroxide.

A method of insulating a rocket motor is also disclosed. The method comprises applying a precursor composition of an insulation to at least a component of a rocket motor and curing the precursor composition to form the insulation. The precursor composition comprises ethylene propylene diene monomer (EPDM), zinc oxide, silica, polymerized 1,2-dihydro-2,2,4-trimethylquinoline, a solid chlorinated paraffin, stearic acid, a five carbon petroleum hydrocarbon, trimethylolpropane trimethacrylate, and a peroxide.

DETAILED DESCRIPTION

Figure 1:
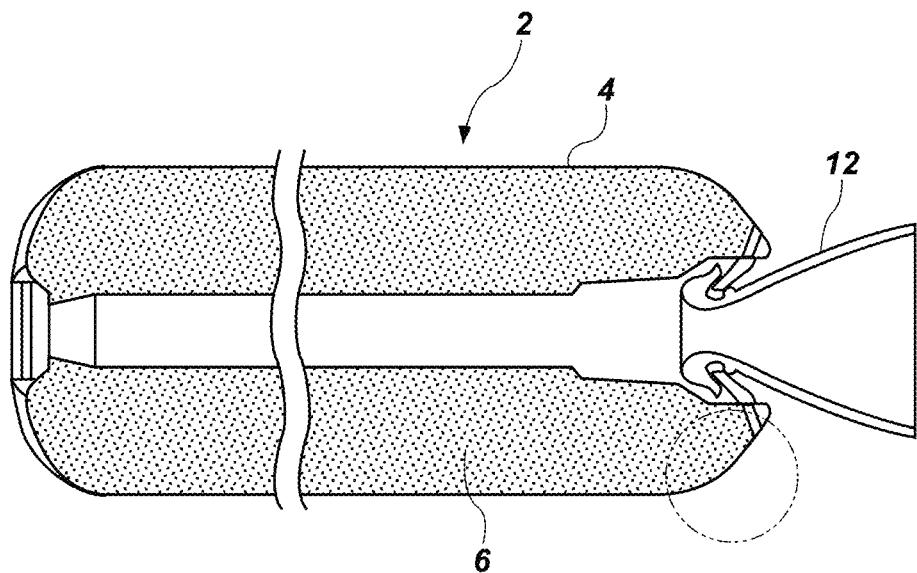
FIG. 1 is a cross-sectional view of a rocket motor including an insulation formed from a precursor composition according to an embodiment of the disclosure.

An insulation including a polymer of ethylene propylene diene monomer (EPDM) is disclosed. When used to insulate a rocket motor or other article to be insulated, the insulation may be characterized as "universal" in that the same insulation may be used on different regions of the particular rocket motor or article that require insulation. The universal insulation is formulated to protect different regions of the rocket motor or article that need protection from one or more of heat, erosion, and other extreme conditions experienced during use and operation of the rocket motor or other article. The universal insulation may be used as internal insulation of the rocket motor or other article, external insulation of the rocket motor or other article, or as a shear ply to couple a case of the rocket motor to a rocket skirt. The universal insulation provides improved or comparable mechanical, physical, rheological, thermal, and ablative properties compared to conventional, silica-filled EPDM-based insulations. By using a single insulation, the cost and complexity of manufacturing the rocket motor or other article is reduced.

A precursor composition of the insulation includes the EPDM, an antioxidant, one or more fillers, a flame retardant, a processing aid, a plasticizer, a co-agent, and a curative. The ingredients of the precursor composition of the insulation are commercially available. Therefore, none of the ingredients are obsolete. The precursor composition of the insulation may be substantially free of fibers. As used herein, the term "precursor composition" means and includes ingredients of the composition before the ingredients are reacted (e.g., cured). Curing the precursor composition forms the insulation, which may then be applied to the rocket motor or other article.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

The illustrations presented herein are not meant to be actual views of any particular device, but are merely idealized representations that are employed to describe the present disclosure. The figures are not necessarily drawn to scale. Additionally, elements common between figures may retain the same numerical designation.

The EPDM is a terpolymer of ethylene, propylene, and a non-conjugated diene. The non-conjugated diene may include, but is not limited to, ethylidene norbornene (ENB). The EPDM may have a diene content of from about 1% by weight (wt %) to about 10 wt %, such as about 5.0 wt %. In one embodiment, the EPDM has a diene content of about 5.0 wt %. The EPDM may have an ethylene content of greater than about 40 wt %, such as between about 40 wt % and about 85 wt %, between about 40 wt % and about 75 wt %. In one embodiment, the EPDM has an ethylene content of about 50 wt %. The EPDM may be commercially available from Dow Chemical Company (Midland, Mich.) under the NORDEL® tradename. By way of example only, the EPDM may be NORDEL® IP 4520. The EPDM may be present in the precursor composition of the insulation at from about 70 parts to about 150 parts. In one embodiment, the EPDM is NORDEL® IP 4520, has a diene content of about 5.0 wt %, an ethylene content of about 50.0 wt %, and is present in the precursor composition of the insulation at about 100 parts.

The antioxidant may be a hydroquinoline compound, such as a polymerized 1,2-dihydro-2,2,4-trimethylquinoline, which is commercially available from Vanderbilt Chemicals, LLC (Norwalk, Conn.) under the AGERITE® tradename. One or more antioxidants may be used. By way of example only, the antioxidant may be AGERITE® Resin D. The antioxidant may be present in the precursor composition of the insulation at from about 0.35 part by weight to about 0.75 part by weight. In one embodiment, the antioxidant is AGERITE® Resin D, a polymerized 1,2-dihydro-2,2,4-trimethylquinoline, and is present in the precursor composition of the insulation at about 0.5 part by weight.

The filler may be zinc oxide, silica (silicon dioxide), or a combination thereof. The zinc oxide may include, but is not limited to, a propionic acid coated zinc oxide having a surface area of from about 4.0 $m^2/g$ to about 6.0 $m^2/g$ and a particle size of from about 0.18 µm to about 0.27 µm, such as Zoco 627, which is commercially available from Zochem Inc. (Brampton, Canada). The silica may be an amorphous, precipitated silica, such as that commercially available from PPG Industries, Inc. (Pittsburgh, Pa.) under the HI-SIL® tradename. By way of example only, HI-SIL® 233 silica having a surface area (BET) of 135 $m^2/g$ may be used as the filler. In one embodiment, the filler includes Zoco 627, the zinc oxide, and HI-SIL® 233, the amorphous, precipitated silica. The zinc oxide may be present in the precursor composition of the insulation at from about 2.1 parts by weight to about 4.5 parts by weight and the amorphous, precipitated silica may be present in the precursor composition of the insulation at from about 21 parts by weight to about 45 parts by weight. In one embodiment, the zinc oxide is present in the precursor composition of the insulation at about 3 parts by weight and the amorphous, precipitated silica is present in the precursor composition of the insulation at about 30 parts by weight.

The flame retardant may be a solid chlorinated paraffin, such as that commercially available from Dover Chemical Corporation (Dover, Ohio) under the CHLOREZ® tradename. The solid chlorinated paraffin may be a 70% chlorinated paraffin, such as CHLOREZ® 700. The solid chlorinated paraffin may be present in the precursor composition of the insulation at from about 4.2 parts by weight to about 9 parts by weight. In one embodiment, the solid chlorinated paraffin is present in the precursor composition of the insulation at about 6 parts by weight.

The processing aid may be a fatty acid or fatty acid derivative, such as that commercially available from PMC Biogenix, Inc. (Memphis, Tenn.) under the INDUSTRENE® tradename. The fatty acid may be a stearic acid ($C_{17}H_{35}CO_2H$), such as INDUSTRENE® B. The stearic acid may be present in the precursor composition of the insulation at from about 0.35 part by weight to about 0.75 part by weight. In one embodiment, the stearic acid is present in the precursor composition of the insulation at about 0.5 part by weight.

The plasticizer may be an aliphatic resin, such as that commercially available from TOTAL Cray Valley (Exton, Pa.) under the WINGTACK® tradename. The aliphatic resin may be a five carbon (C5) petroleum hydrocarbon, such as WINGTACK® 95. The aliphatic resin may be present in the precursor composition of the insulation at from about 4.2 parts by weight to about 9 parts by weight. In one embodiment, the aliphatic resin is present in the precursor composition of the insulation at about 6 parts by weight.

The co-agent may be a low volatility trifunctional monomer, such as trimethylolpropane trimethacrylate, which is commercially available from Sartomer Americas (Exton, Pa.) as SR350. One or more co-agents may be used. The co-agent may be present in the precursor composition of the insulation at from about 5.6 parts by weight to about 12 parts by weight. In one embodiment, the trimethylolpropane trimethacrylate is present in the precursor composition of the insulation at about 8 parts by weight.

The curative may be a crosslinking peroxide, such as that commercially available from Arkema Inc. (Exton, Pa.) under the LUPEROX® tradename. One or more curatives may be used. By way of example only, the curative may be LUPEROX® 231 XL40, which is a 40% active dispersion of LUPEROX® 231 (1,1-di-(t-butylperoxy)-3,3,5-trimethylcyclohexane) polymer initiator on calcium carbonate. The curative may be present in the precursor composition of the insulation at from about 5.6 parts by weight to about 12 parts by weight. In one embodiment, the curative is present in the precursor composition of the insulation at about 8 parts by weight.

While specific examples of the antioxidant, co-agent, and curative are provided above, other antioxidants, co-agents, and/or curatives may be used depending on the desired shelf life of the uncured precursor composition or of the insulation or the desired mechanical properties of the insulation. The antioxidant may be selected depending on whether the precursor composition is to have an increased or decreased shelf life. Other co-agents and curatives may be selected depending on the desired mechanical properties of the insulation.

The precursor composition of the insulation may, optionally, include multiwalled carbon nanotubes depending on the desired ESD properties of the uncured precursor composition or of the insulation. The multiwalled carbon nanotubes include, but are not limited to, those commercially available from Arkema Inc. (Exton, Pa.) under the GRAPHISTRENGTH® tradename, such as GRAPHISTRENGTH® EPDM 20. GRAPHISTRENGTH® EPDM 20 contains predispersed multiwalled carbon nanotubes at a concentration of 17 wt % (20 parts).

The precursor composition of the insulation may include fewer ingredients than conventional, silica-filled EPDM insulation, reducing the cost and complexity of manufacturing an article including the insulation. In one embodiment, the precursor composition of the insulation has 13 ingredients, compared to 22 ingredients in the conventional silica-filled EPDM insulations. By including fewer ingredients, future obsolescence issues with the ingredients may be reduced, such as qualification costs for future materials. The ingredients may be commercially available, further reducing the obsolescence cost.

The precursor composition may be prepared by combining (e.g., mixing) the EPDM, antioxidant, one or more fillers, flame retardant, processing aid, plasticizer, co-agent, and curative in a mixer, such as an internal mixer. All of the ingredients are solid at room temperature. The ingredients are combined in the mixer to form the homogeneous precursor composition. Since the precursor composition does not include fibers, the precursor composition is an isotropic material having substantially uniform properties throughout. Shear in the mixer generates a sufficient amount of heat to soften the EPDM, enabling the homogeneous precursor composition to be formed without adding a solvent. Thus, the precursor composition may be prepared by a solvent-less process. Since no solvents are used, a solvent removal process, such as drying or solvent evaporation, is not needed before curing the precursor composition to form the insulation.

The precursor composition may be shaped into its desired form, such as by extruding, calendaring, or compression molding. The precursor composition may exhibit a sufficiently low viscosity such that the precursor composition has a flowable consistency before curing. As used herein, the term "flowable" means and includes a sufficiently low viscosity that enables the precursor composition to change shape or direction substantially uniformly in response to heat and/or shear, such that the precursor composition readily flows out of a container at room temperature. The flow behavior and extrudability of the precursor composition reduces the cost of manufacturing the rocket motor because the precursor composition or resulting insulation may be applied to the rocket motor by automated layup processes. By reducing or eliminating manual layup processes, the cost of manufacturing the rocket motor may be reduced. By way of example only, the precursor composition may be calendared to a desired thickness, such as a thickness of about 0.1 inch (about 0.254 cm). Once prepared, the precursor composition may be applied to the rocket motor or other article and cured. Alternatively, the precursor composition may be stored until use. The precursor composition may be used as internal insulation or external insulation of a rocket motor, or as a shear ply depending on the configuration of the rocket motor. The precursor composition may be used as a shear ply to couple a case of the rocket motor to a rocket skirt. The precursor composition may be applied to the rocket motor by hand layup or by automated layup processes.

In addition to being used as insulation in rocket motors, the insulation may be used in other articles where protection from heat and gases is desired. For example, the insulation may be used for heat and gas protection in under-the-hood applications in automobiles. The insulation may also be used in conveyor belts and in noise-damping applications in automobile and other fields. In addition, since the insulation may be extruded, compression molded, or calendared, the insulation may be used in routine rubber applications including, but not limited to, such applications as hoses, gaskets, seals, isolators and mounts, cushions, air emission hoses, and dock fenders.

Methods of applying the precursor composition to the rocket motor and curing the precursor composition are known in the art and, therefore, are not described in detail herein. The precursor composition may be applied to a case of the rocket motor and cured, forming the insulation on an inner surface of the case. While the curing may occur at room temperature (about 20° C.-25° C.), the curing may be accelerated by applying at least one of heat and pressure as known in the art. Alternatively, the precursor composition may be applied to a mandrel, cured to form the insulation, and subsequent layers of the rocket motor formed over the insulation.

Figure 2:
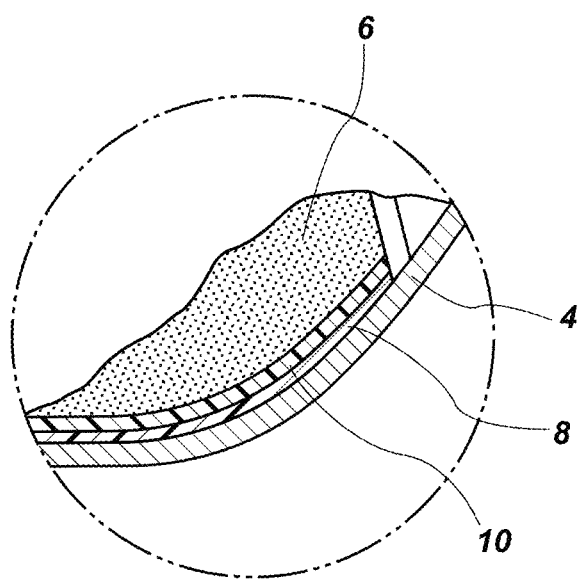
FIG. 2 is an enlarged view of the portion of the rocket motor encircled in FIG. 1.

As shown in FIGS. 1 and 2, insulation 8 may be used in a rocket motor 2. The rocket motor 2 includes a case 4 produced from a rigid, durable material, such as a metal or composite. The case 4 houses a solid propellant 6 that combusts to provide the thrust necessary to propel the rocket motor 2. The insulation 8 is applied to an inner surface of the case 4, and is present between the case 4 of the rocket motor 2 and the propellant 6. An optional liner 10 may be present between the insulation 8 and the propellant 6. Methods for loading the case 4 with the insulation 8, optional liner 10, and propellant 6 are known in the art and, therefore, are not described in detail herein. Nozzle 12 is operatively associated with the case 4 to receive combustion products generated by combustion of the propellant 6 and to expel the combustion products, generating thrust to propel the rocket motor 2. During use and operation of the rocket motor 2, the insulation 8 protects the case 4 from heat and particle streams that are generated by combustion of the propellant 6.

While the insulation 8 is shown as being applied to the inner surface of the case 4, the insulation 8 may be used on other regions of the rocket motor 2, either internally, externally, or both. For example, the insulation 8 may provide ablative protection to an external bulk of the case 4 and nozzle 12. Additionally, while the insulation 8 may be used for insulating a solid rocket motor and other large-scale motors, the insulation may also be used with other motors, such as biliquid, hybrid and reverse hybrid motors, or with rocket motor-propelled missiles.

A method of insulating the rocket motor 2 is also described. The method comprises producing the precursor composition that includes the ingredients described above. The precursor composition is deposited on, or applied to, the inner surface of the case 4 of the rocket motor 2. The precursor composition is subsequently cured to form the insulation 8.

The precursor compositions according to embodiments of the disclosure may exhibit comparable or improved mechanical and ablative properties and improved processing characteristics compared to conventional, silica-filled EPDM-based insulations. Finding a balance between good mechanical and ablative properties and good processing characteristics has been difficult with conventional, silica-filled EPDM-based insulations. To achieve the desired balance, the conventional, such silica-filled EPDM-based insulations have included fibers to provide good ablative properties. However, adding fibers increases the cost and complexity of manufacturing rocket motors that include the conventional, silica-filled EPDM-based insulations. It was surprising that the precursor composition of the insulation provided good ablative properties without including fibers in the precursor composition. Therefore, the cost and complexity of manufacturing rocket motors that include insulation formed from the precursor compositions is reduced.

The following examples serve to explain embodiments of the disclosure in more detail. These examples are not to be construed as being exhaustive or exclusive as to the scope of this disclosure.

EXAMPLES

Example 1

Precursor Composition Formulations

Precursor compositions including the ingredients shown in Table 1 were produced.

TABLE 1

Formulation of Precursor Compositions

| Ingredient | EPDM Composition A Amount (parts) | EPDM Composition B Amount (parts) |
|---|---|---|
| NORDEL ® IP 4520 | 100 | 60.92 |
| AGERITE ® Resin D | 0.5 | 0.5 |
| Zoco 672 | 3 | 3 |
| HI-SIL ® 233 | 30 | 30 |
| CHLOREZ ® 700 | 6 | 6 |
| GRAPHISTRENGTH ® EPDM 20 | 0 | 47.08 |
| INDUSTRENE ® B | 0.5 | 0.5 |
| WINGTACK ® 95 | 6 | 6 |
| SR350 | 8 | 8 |
| LUPEROX ® 231 XL40 | 8 | 8 |

Each of the ingredients was commercially available and was used as received. The ingredients in Table 1 were added to an internal mixer and combined to produce the precursor compositions.

Example 2

Mechanical, Physical, and Thermal Properties

The mechanical, physical, and thermal properties of the precursor compositions described in Example 1 were determined and are shown in Table 2. The mechanical, physical, and thermal properties were determined by conventional techniques. The precursor compositions of Example 1 are indicated in Table 2 as "EPDM Composition A" and "EPDM Composition B," respectively. The properties of EPDM Compositions A and B were compared to two conventional, silica-filled EPDM compositions, which are indicated in Table 2 as "EPDM Comparative Composition C" and "EPDM Comparative Composition D." EPDM Comparative Compositions C and D included a larger number of ingredients than EPDM Composition A, and EPDM Comparative Composition D included a larger number of ingredients than EPDM Composition B.

TABLE 2

Mechanical, Physical, and Thermal properties of Precursor Formulation

| Property | EPDM Composition A | EPDM Composition B | EPDM Comparative Composition C | EPDM Comparative Composition D |
|---|---|---|---|---|
| Number of Ingredients | 9 | 11 | 10 | 14 |
| Specific Gravity | 1.05 | 1.08 | 1.02-1.08 | 1.04-1.07 |
| Mooney Viscosity at 212° F. | 44.5 | — | 52-57 | 62-82 |
| Tack Time (sec) | 54 | 152 | 2 | 2-300 |
| ESD Surface Resistivity (ohms/sq) | $1.04 \times 10^{17}$ | $3.0 \times 10^{5}$ | $3.51 \times 10^{14}$ | — |
| ESD Volume Resistivity (ohms · cm) | $1.75 \times 10^{15}$ | $1.2 \times 10^{8}$ | $5.22 \times 10^{13}$ | — |
| Modulus (psi) | 1093 | 2073 | 2073 | — |
| Stress Capability (psi) | 1553 | 1620 | 1500-3000 | 1450-3000 |
| Strain (%) | 626 | 348 | 400-800 | 450-700 |
| Propellant Compatibility | Compatible | — | Compatible | Compatible |

TABLE 2-continued

Mechanical, Physical, and Thermal properties of Precursor Formulation

| Property | EPDM Composition A | EPDM Composition B | EPDM Comparative Composition C | EPDM Comparative Composition D |
|---|---|---|---|---|
| Permeability at 20% Strain | Non-Permeable | — | Non-Permeable | Non-Permeable |
| Coefficient of Thermal Expansion (in/in ° F. × $10^{-6}$) | 197-215 | — | 145-228 | — |
| ESD | Insulating | ESD/Conductive | Insulating | Insulating |

"—" indicates not reported

EPDM Composition A exhibited improved Mooney viscosity and tack time compared to EPDM Comparative Compositions C and D. EPDM Composition A also exhibited comparable modulus, stress capability, and strain compared to EPDM Comparative Compositions C and D. EPDM Composition A was also compatible with conventional propellants including, but not limited to, NEPE, PBAN, and HTPB. EPDM Composition A was also determined to be non-permeable to gases produced as volatile, combustion products during use of the precursor composition as insulation. EPDM Composition B exhibited improved ESD properties compared to EPDM Composition A.

Example 3

Flow and Extrudability Properties

Figure 3:
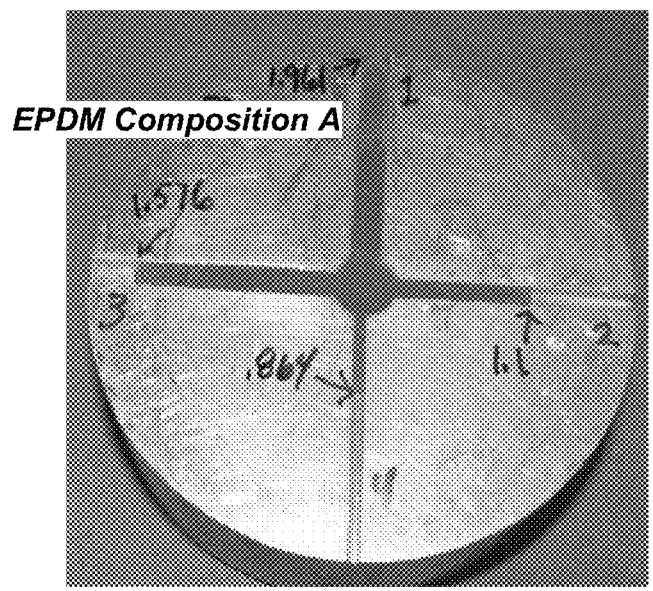
FIG. 3 is a photograph showing the flow properties of an insulation according to an embodiment of the disclosure in a spider mold.

The rubber flow behavior of EPDM Composition A described in Example 1 was determined by conventional techniques. The precursor composition was placed in a spider mold and cured. As shown in FIG. 3, the insulation exhibited good rubber flow characteristics in the spider mold.

Figure 4:
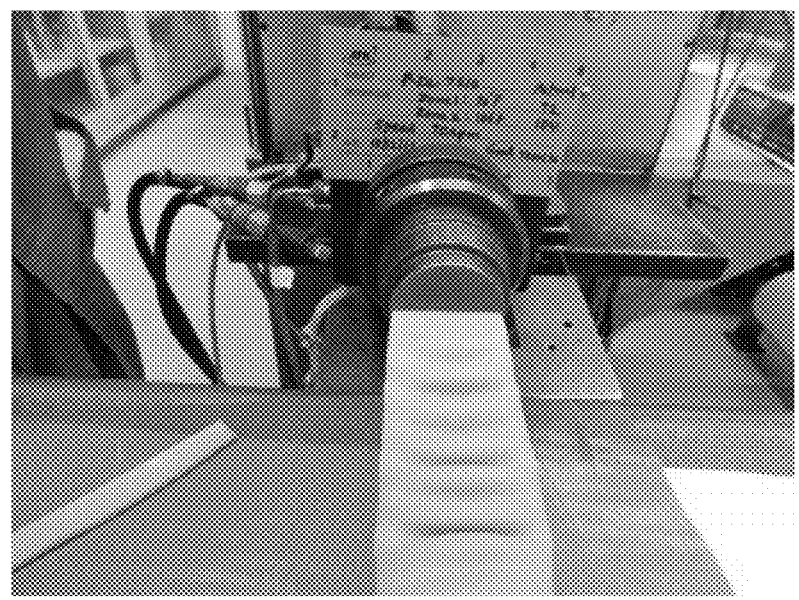
FIG. 4 is a photograph showing the extrusion properties of a precursor composition of the insulation according to an embodiment of the disclosure.

The extrusion ability of EPDM Composition A was determined by conventional techniques. As shown in FIG. 4, EPDM Composition A exhibited good extrudability. EPDM Composition A was able to be extruded at a faster rate than the EPDM Comparative Composition C and EPDM Comparative Composition D.

Example 4

Ablative Properties

The ablative properties of EPDM Composition A described in Example 1 were determined in a low Mach seventy pound char (SPC) motor test. The SPC motor test simulated conventional temperature and pressure conditions in low velocity, mid velocity, and high velocity sections of the char motor. The diameter of the char motor varies in these three sections, with the char motor having a relatively large diameter in the low velocity section while in the high velocity section, the char motor has a relatively small diameter. The diameter of the char motor at a given location determines the amount of exposure that the insulation receives. If the diameter is small, that section of the char motor will be exposed to more gases and will be more prone to erosion than if the diameter is large. Therefore, a particular portion of the char motor in the low velocity section is exposed to a reduced amount of gases in comparison to a particular portion of the char motor in the high velocity section.

EPDM Composition A was formed into a thin sheet, cured, and assembled into the char motor by conventional techniques. The thickness of the insulation was measured at selected intervals, nominally one inch apart, before firing the char motor. The weight of the part was also recorded before firing the char motor. After firing, the char motor was disassembled, and the thickness and weight of the insulation were measured again. The rate at which the insulation is reduced or eroded is expressed in terms of the reduction of the thickness of the insulation per second, and is referred to as the material affected rate or material ablation rate ("MAR"). The MAR of the insulation was determined by subtracting the post-fired thickness of virgin insulation (i.e., after the char had been removed) at a given point from the pre-fired thickness at the same point and dividing the result by the burn time of the char motor. The average weight loss of the insulation was determined as a function of the pre-fired weight. The MAR and average weight loss are indicators of damage (e.g., ablation) to the insulation, where lower numbers indicate better insulative and ablative performance. The ablative performance of the insulation is shown in FIGS. 5-7 for the low velocity, mid velocity, and high velocity sections of the char motor.

Figure 5:
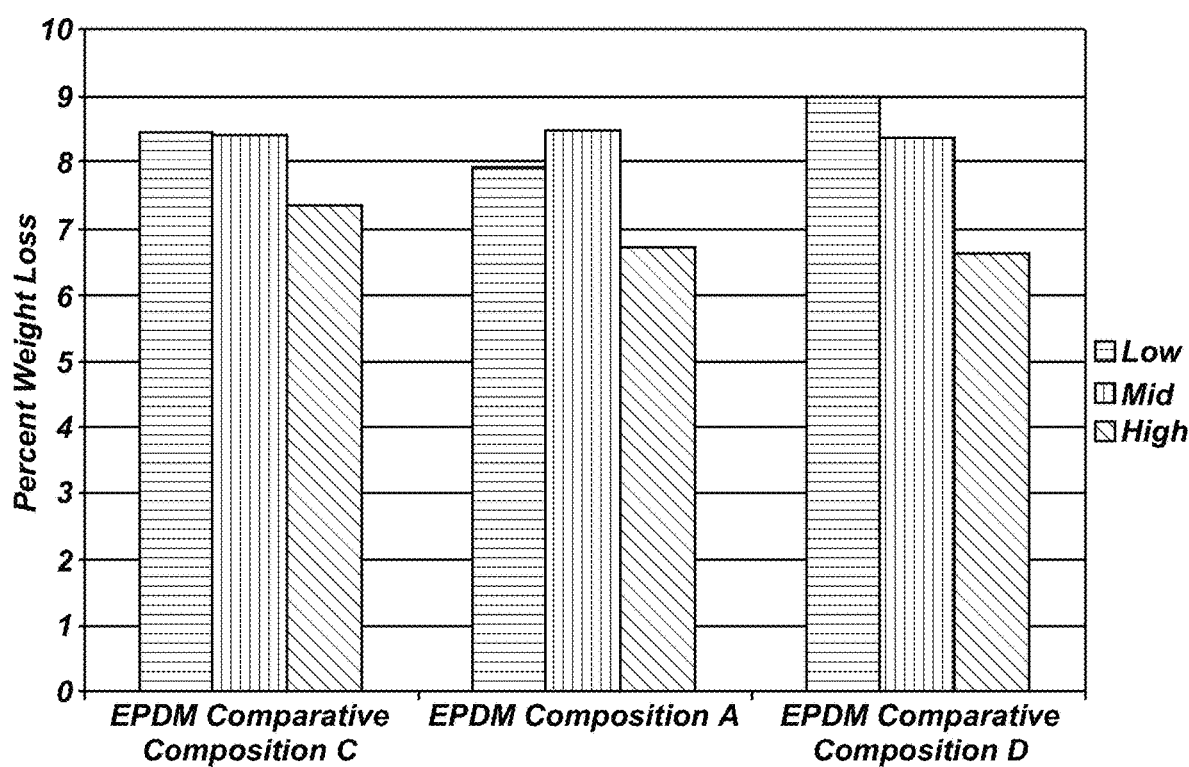
FIG. 5 is a bar graph showing weight loss (percent weight loss) from a seventy pound char (SPC) motor test of low, mid, and high sections of the char motor having insulation formed from the precursor composition according to an embodiment of the disclosure compared to two conventional, silica-filled EPDM insulations.

In FIG. 5, the percent weight loss for the insulation formed from the precursor composition described in Example 1 (identified in FIG. 5 as "EPDM Composition A") is compared to that of the two conventional, silica-filled EPDM compositions (indicated in FIG. 5 as "EPDM Comparative Composition C" and "EPDM Comparative Composition D"). The percent weight loss was measured for the low velocity, mid velocity, and high velocity sections of the char motor. EPDM Composition A exhibited improved or comparable ablative properties compared to the two conventional, silica-filled EPDM compositions.

Figure 6:
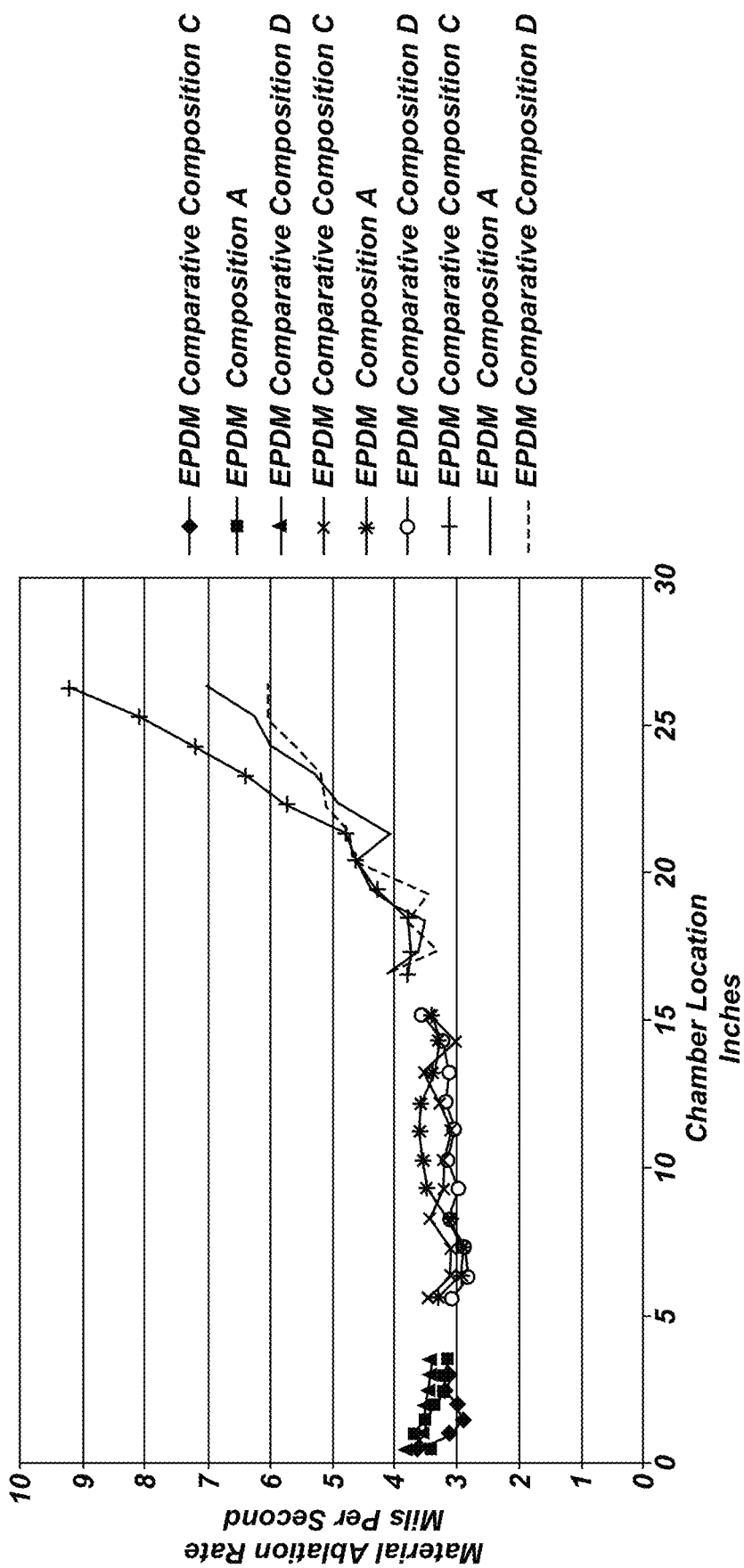
FIG. 6 is a plot of the material ablation rate (mm/s) versus chamber location (inches) of the insulation formed from the precursor composition according to an embodiment of the disclosure from the low, mid, and high sections of the SPC motor test compared to two conventional, silica-filled EPDM insulations.

In FIG. 6, the MAR for the insulation formed from the precursor composition described in Example 1 (identified in FIG. 6 as "EPDM Composition A") is compared to that of the two conventional, silica-filled EPDM compositions (indicated in FIG. 6 as "EPDM Comparative Composition C" and "EPDM Comparative Composition D"). The MAR was measured for the low velocity, mid velocity, and high velocity sections of the char motor. EPDM Composition A exhibited improved or comparable ablative properties compared to the two conventional, silica-filled EPDM compositions.

Figure 7:
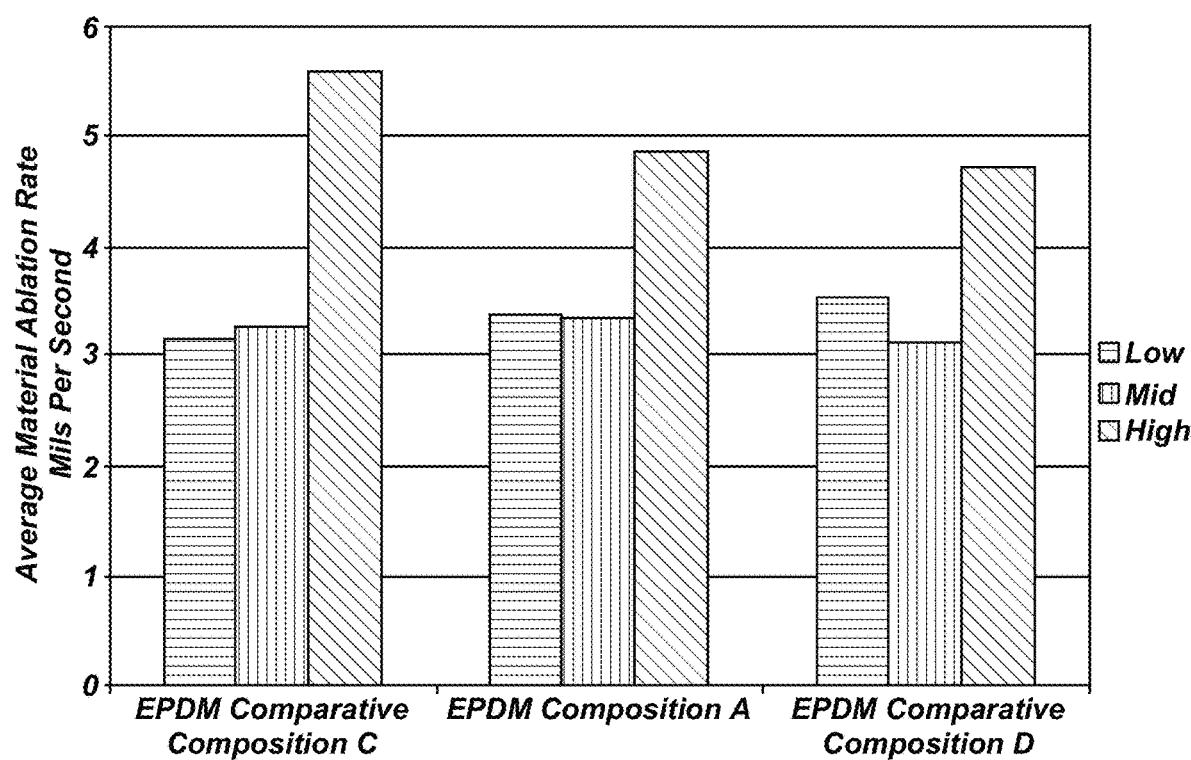
FIG. 7 is a bar graph showing the average material ablation rate (mm/s) of the insulation formed from the precursor composition according to an embodiment of the disclosure from the low, mid, and high sections of the SPC motor test compared to two conventional, silica-filled EPDM insulations.

In FIG. 7, the average MAR for the insulation formed from the precursor composition described in Example 1 (identified in FIG. 7 as "EPDM Composition A") is compared to that of the two conventional, silica-filled EPDM compositions (indicated in FIG. 7 as "EPDM Comparative Composition C" and "EPDM Comparative Composition D"). The average MAR was measured for the low velocity, mid velocity, and high velocity sections of the char motor. EPDM Composition A exhibited improved or comparable ablative properties compared to the two conventional, silica-filled EPDM compositions.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the following appended claims and their legal equivalents.

What is claimed is:

1. A precursor composition, comprising, before curing: ethylene propylene diene monomer (EPDM), zinc oxide, silica, a solid chlorinated paraffin, an antioxidant, a processing aid, a plasticizer, a coagent, and a curative.

2. The precursor composition of claim 1, wherein the precursor composition comprises from about 4.2 parts by weight to about 9 parts by weight of the solid chlorinated paraffin.

3. The precursor composition of claim 1, wherein the precursor composition comprises from about 2.1 parts by weight to about 4.5 parts by weight of the zinc oxide.

4. The precursor composition of claim 1, wherein the precursor composition comprises from about 21 parts by weight to about 45 parts by weight of the silica.

5. The precursor composition of claim 1, wherein the coagent comprises trimethylolpropane trimethacrylate.

6. The precursor composition of claim 1, wherein the curative comprises a peroxide.

7. The precursor composition of claim 1, wherein the precursor composition comprises less than about 12 parts by weight of the curative.

8. A precursor composition, comprising, before curing: ethylene propylene diene monomer (EPDM), zinc oxide, silica, a solid chlorinated paraffin, stearic acid, an antioxidant, a plasticizer, a coagent, and a peroxide.

9. The precursor composition of claim 8, wherein the precursor composition comprises from about 0.35 part by weight to about 0.75 part by weight of the stearic acid.

10. The precursor composition of claim 8, wherein the EPDM comprises a non-conjugated diene and the EPDM comprises a diene content of from about 1% by weight (wt %) to about 10 wt %.

11. The precursor composition of claim 8, wherein the EPDM comprises an ethylene content of between about 40 wt % and about 85 wt %.

12. The precursor composition of claim 9, wherein the antioxidant comprises polymerized 1,2-dihydro-2,2,4-trimethylquinoline.

13. The precursor composition of claim 8, wherein the precursor composition comprises from about 0.35 part by weight to about 0.75 part by weight of the antioxidant.

14. The precursor composition of claim 8, wherein the plasticizer comprises a five carbon petroleum hydrocarbon.

15. The precursor composition of claim 8, wherein the precursor composition comprises from about 4.2 parts by weight to about 9 parts by weight of the plasticizer.

16. The precursor composition of claim 8, wherein the coagent comprises a low volatility trifunctional monomer.

17. The precursor composition of claim 8, wherein the coagent comprises trimethylolpropane trimethacrylate.

18. The precursor composition of claim 8, wherein the precursor composition comprises from about 5.6 parts by weight to about 12 parts by weight of the coagent.

19. The precursor composition of claim 8, wherein the peroxide comprises 1,1-di-(t-butylperoxy)-3,3,5-trimethylcyclohexane.

20. The precursor composition of claim 8, further comprising multiwalled carbon nanotubes.

21. A rocket motor, comprising:
a case, an insulation on at least a portion of the case, and a propellant in the case, the insulation comprising:
a reaction product of ethylene propylene diene monomer (EPDM), zinc oxide, silica, a solid chlorinated paraffin, an antioxidant, a processing aid, a plasticizer, a coagent, and a curative.

22. The precursor composition of claim 1, wherein the antioxidant comprises a hydroquinoline compound and the coagent comprises trimethylolpropane trimethacrylate.

23. The precursor composition of claim 1, wherein the antioxidant comprises polymerized 1,2-dihydro-2,2,4-trimethylquinoline and the coagent comprises trimethylolpropane trimethacrylate.

* * * * *

UNITED STATES PATENT AND TRADEMARK OFFICE
CERTIFICATE OF CORRECTION

PATENT NO. : 11,306,683 B2
APPLICATION NO. : 16/809396
DATED : April 19, 2022
INVENTOR(S) : Himansu M. Gajiwala et al.

It is certified that error appears in the above-identified patent and that said Letters Patent is hereby corrected as shown below:

In the Claims

Claim 12, Column 12, Line 8, change "claim 9," to --claim 8,--

Signed and Sealed this
Twenty-eighth Day of February, 2023

*Katherine Kelly Vidal*

Katherine Kelly Vidal
*Director of the United States Patent and Trademark Office*